(12) United States Patent
Wang et al.

(10) Patent No.: US 9,651,204 B2
(45) Date of Patent: May 16, 2017

(54) BACKLIGHT AND DISPLAY DEVICE HAVING THE SAME

(71) Applicant: BOE TECHNOLOGY GROUP CO., LTD., Beijing (CN)

(72) Inventors: Shang Wang, Beijing (CN); Zhihong Du, Beijing (CN); Lilei Zhang, Beijing (CN)

(73) Assignee: BOE TECHNOLOGY GROUP CO., LTD. (CN)

(*) Notice: Subject to any disclaimer, the term of this patent is extended or adjusted under 35 U.S.C. 154(b) by 0 days.

(21) Appl. No.: 14/416,021

(22) PCT Filed: May 21, 2014

(86) PCT No.: PCT/CN2014/078017
§ 371 (c)(1),
(2) Date: Jan. 20, 2015

(87) PCT Pub. No.: WO2015/067027
PCT Pub. Date: May 14, 2015

(65) Prior Publication Data
US 2015/0338031 A1    Nov. 26, 2015

(30) Foreign Application Priority Data

Nov. 8, 2013   (CN) .......................... 2013 1 0553742

(51) Int. Cl.
*F21K 99/00*    (2016.01)
*F21V 5/02*    (2006.01)
(Continued)

(52) U.S. Cl.
CPC ................. *F21K 9/50* (2013.01); *F21V 5/02* (2013.01); *F21V 7/05* (2013.01); *F21V 13/04* (2013.01);
(Continued)

(58) Field of Classification Search
CPC ... F21K 9/50; F21K 9/60; F21V 13/04; F21V 29/70; F21V 5/02; F21V 5/04; F21V 5/08;
(Continued)

(56) References Cited

U.S. PATENT DOCUMENTS 7,751,458 B2 * 7/2010 Regaard ................ H01S 5/4012
372/101
8,109,644 B2 * 2/2012 Bierhuizen .......... G02B 6/0018
362/249.02
(Continued)

FOREIGN PATENT DOCUMENTS

CN          1591121 A       3/2005
CN          1928667 A       3/2007
(Continued)

OTHER PUBLICATIONS

International Search Report and Written Opinion in PCT International Application No. PCT/CN2014/078017, dated Aug. 20, 2014.

*Primary Examiner* — Hargobind S Sawhney
(74) *Attorney, Agent, or Firm* — Brooks Kushman P.C.

(57) ABSTRACT

The backlight according to the present disclosure may include a monochromatic laser diode, a reflector and a beam-expanding prism. The monochromatic laser diode and the beam-expanding prism may be arranged on the reflector, and monochromatic laser beams from the monochromatic laser diode may be expanded after being reflected by the beam-expanding prism.

16 Claims, 4 Drawing Sheets

(51) Int. Cl.
*F21V 7/05* (2006.01)
*F21V 13/04* (2006.01)
*F21V 29/70* (2015.01)
*G02B 5/04* (2006.01)
*G02F 1/1335* (2006.01)

(52) U.S. Cl.
CPC .............. *F21V 29/70* (2015.01); *G02B 5/04* (2013.01); *G02F 1/133605* (2013.01); *G02F 1/133606* (2013.01); *G02F 1/133603* (2013.01); *G02F 2001/133607* (2013.01)

(58) Field of Classification Search
CPC ........ F21V 7/09; F21V 7/0008; F21V 7/0091; F21V 7/048; F21Y 2101/025; F21Y 2103/10; G02B 19/0028; G02B 6/0055; G02B 5/04; G02B 5/045; G02B 19/0057; G02B 6/0011; G02B 6/0023; G02B 6/0031; G02F 1/133602; G02F 1/133603; G02F 1/133606; G02F 1/133611; G02F 2001/133607; G03B 21/2033; G03B 2215/0567
See application file for complete search history.

(56) References Cited

U.S. PATENT DOCUMENTS

| | | | | |
|---|---|---|---|---|
| 8,727,581 | B2* | 5/2014 | Saccomanno | F21V 3/04 362/311.06 |
| 8,807,771 | B2* | 8/2014 | Takeuchi | G02F 1/133603 362/97.1 |
| 9,103,950 | B2* | 8/2015 | Nishitani | G02B 6/0028 |
| 2006/0221592 | A1* | 10/2006 | Nada | H01L 33/22 362/23.18 |
| 2007/0274099 | A1 | 11/2007 | Tai et al. | |
| 2008/0055515 | A1 | 3/2008 | Ha et al. | |
| 2008/0112156 | A1* | 5/2008 | Hsieh | F21V 7/0091 362/97.1 |
| 2009/0140047 | A1* | 6/2009 | Yu | G06K 7/10732 235/462.26 |
| 2010/0182236 | A1* | 7/2010 | Pryor | H04N 9/3129 345/158 |
| 2011/0128466 | A1* | 6/2011 | Ishii | C09K 11/7734 349/61 |
| 2011/0292302 | A1* | 12/2011 | Park | G02B 19/0071 348/739 |
| 2012/0212689 | A1* | 8/2012 | Chang | G02F 1/133605 349/64 |
| 2015/0176807 | A1* | 6/2015 | Park | G02B 19/0071 362/235 |

FOREIGN PATENT DOCUMENTS

| | | |
|---|---|---|
| CN | 201606739 U | 10/2010 |
| CN | 201706302 U | 1/2011 |
| CN | 102767739 A | 11/2012 |
| CN | 202708858 U | 1/2013 |
| CN | 103591509 A | 2/2014 |
| JP | H03-67215 A | 3/1991 |
| JP | 2005-116268 A | 4/2005 |
| KR | 10-2006-0135109 A | 12/2006 |
| TW | 200807102 A | 2/2008 |

* cited by examiner

BACKLIGHT AND DISPLAY DEVICE HAVING THE SAME

CROSS-REFERENCE TO RELATED APPLICATION

This application is the U.S. national phase of PCT Application No. PCT/CN2014/078017 filed on May 21, 2014, which claims priority to Chinese Patent Application No. 201310553742.2 filed on Nov. 8, 2013, the disclosures of which are incorporated in their entirety by reference herein.

FIELD OF THE INVENTION

The present disclosure relates to the field of display technology, in particular to a backlight and a display device having the backlight.

DESCRIPTION OF THE PRIOR ART

For a traditional liquid crystal display device, usually a cold cathode fluorescent lamp (CCFL) or light emitting diode (LED) is used as a backlight.

The LED has currently become a mainstream of the backlight for a lighting device or a display device due to its characteristics such as small volume, long lifetime and high reliability. However, it is of inferior light characteristics and luminous efficiency, as well as poor heat dissipation capability. In addition, for the light from the LED, its wavelength is of a certain spectral range and its color purity is low. The CCFL can be initiated rapidly at a low temperature and can be readily manufactured into various shapes. Although with high brightness, its heat dissipation capability is poor and its color purity is low too. Further, the most serious drawback for the CCFL lies in the spectral characteristics. The CCFL is of a small color gamut, up to only 72% of the National Television Standards Committee (NTSC) standard. White rays from the backlight are required to pass through a RGB color filter so as to generate an image, so the wavelengths of the rays of the three primary colors, i.e., R, G and B, in the white rays from the backlight (i.e., the color purity of the R, G and B primary colors) will directly affect a color effect of the display device. In this regard, the white rays from the CCFL cannot serve as a light source with ideal spectral characteristics.

In a word, for the traditional display device, there will exist such a defect as low color purity due to the low monochromaticity of the rays from the backlight, no matter whether the LED or the CCFL is used as the backlight.

SUMMARY OF THE INVENTION

Problems to be Solved

An object of the present disclosure is to improve the monochromaticity of rays from the backlight, and improve the transmittance of the rays from the backlight on a liquid crystal screen.

Technical Solutions

In one aspect, the present disclosure provides a backlight, including a monochromatic laser diode, a reflector and a beam-expanding prism. The monochromatic laser diode and the beam-expanding prism are arranged on the reflector, and monochromatic laser beams from the monochromatic laser diode are expanded after being reflected by the beam-expanding prism.

Further, the monochromatic laser diode may include a red laser diode, a green laser diode and a blue laser diode arranged side by side on the reflector.

Further, currents with different intensities may be applied to the red laser diode, the green laser diode and the blue laser diode, respectively.

Further, the beam-expanding prism may be a total internal reflection beam-expanding prism.

Further, the total internal reflection beam-expanding prism may include a beam-expanding surface, a refractive surface and a totally reflective surface. An oblique surface of the total internal reflection beam-expanding prism located at a side close to the monochromatic laser diode and angled relative to the reflector may be the refractive surface, an oblique surface of the total internal reflection beam-expanding prism located at a side away from the monochromatic laser diode and angled relative to the reflector may be the totally reflective surface, and an upper portion of the total internal reflection beam-expanding prism may be the curved beam-expanding surface.

Further, the monochromatic laser diode may be welded onto the reflector, and the beam-expanding prism and the monochromatic laser diode may be integrated into a package together with a heat dissipator.

Further, the backlight may include a brightness enhancement film and a scattering film, and the scattering film may be arranged above the brightness enhancement film.

Further, the brightness enhancement film may include a lower brightness enhancement film, and an upper brightness enhancement film arranged above the lower brightness enhancement film.

In yet another aspect, the present disclosure provides a display device including the above-mentioned backlight.

Further, the backlight may be a direct-type backlight.

Advantageous Effects

According to the present disclosure, the backlight includes the monochromatic laser diode, the reflector and the beam-expanding prism. The monochromatic laser diode and the beam-expanding prism are arranged on the reflector, and the laser beams from the monochromatic laser diode are expanded after being reflected by the beam-expanding prism. In the present disclosure, an existing LED is replaced with the laser diode having such characteristics such as excellent monochromaticity, a light-emitting angle and linear polarization both much smaller than those of the LED, as well as a small light outlet, so as to serve as the backlight. The monochromatic laser beams from the monochromatic laser diode are expanded after being reflected by the beam-expanding prism, so as to obtain the RGB backlight. Due to the excellent monochromaticity and high color purity, the transmittance of the laser beams on the liquid crystal screen will be improved. In addition, the display device of the present disclosure includes the direct-type backlight, and as a result, it is able to improve its color effect.

DETAILED DESCRIPTION OF THE PREFERRED EMBODIMENTS

The present disclosure will be described hereinafter in conjunction with the drawings and embodiments. The following embodiments are for illustrative purposes only, but shall not be used to limit the scope of the present disclosure.

Figure 1:
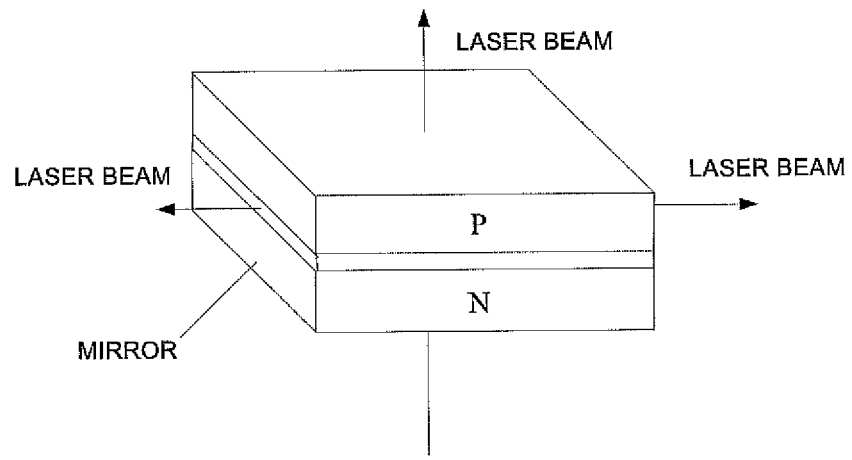
FIG. 1 is a schematic view showing a laser diode.
Figure 2:
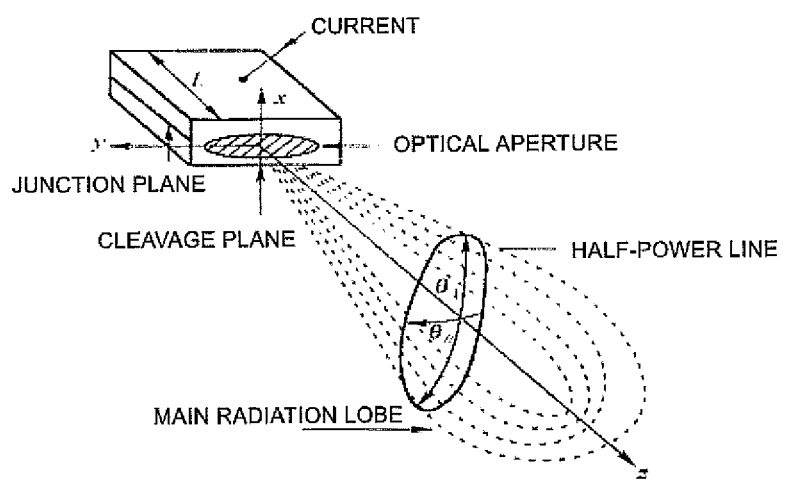
FIG. 2 is a schematic view showing a light-emitting principle of the laser diode.

Along with the development of the laser technology, especially the semiconductor laser technology, a laser diode (LD) has attained certain technical advantages over an LED in such fields as display devices and lighting devices. For example, the ray from the LD is monochromatic, which is close to that from a gas laser. In addition, the LD has a light-emitting angle and linear polarization both smaller than those of the LED as well as a small light outlet. FIG. 1 shows a structure of the LD, in which the radiation is just the stimulated radiation, and laser beams from which are of totally the same frequency, phase and polarization state. For a stimulated light-emitting system, it includes both the stimulated radiation and the stimulated absorption. However, only when the stimulated radiation is dominant would the light from the outside be amplified so as to generate the laser beams. FIG. 2 shows a light-emitting principle of the LD. After the current is applied to the LD, the stimulated radiation will occur, and the LD will emit the laser beams to the outside through an optical aperture, and a half-power line and a main radiation lobe as shown in FIG. 2 will be formed.

In the present disclosure, an existing LED is replaced with the LD so as to serve as a backlight. A shown in FIG. 3, which is a sectional side view of the backlight of the present disclosure, the backlight includes a monochromatic laser diode 9, a reflector 1 and a beam-expanding prism 2. The monochromatic laser diode and the beam-expanding prism are arranged on the reflector, and monochromatic laser beams from the monochromatic laser diode are expanded after being reflected by the beam-expanding prism.

In the mentioned backlight, the monochromatic laser diode serves as the light source, and the laser beams from the monochromatic laser diode are expanded after being reflected by the beam-expanding prism, so as to form the RGB backlight. As a result, the laser beams have excellent monochromaticity, as well as high color purity and transmittance on a liquid crystal screen.

Figure 4:
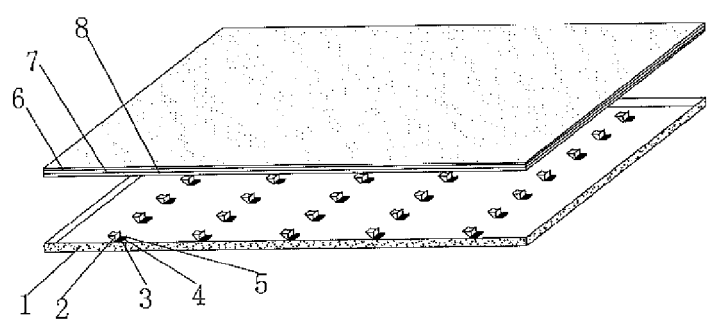
FIG. 4 is a perspective view showing the backlight according to one embodiment of the present disclosure.

Preferably, the monochromatic laser diode 9 in this embodiment includes a red laser diode 3, a green laser diode 4 and a blue laser diode 5 arranged side by side on the reflector 1. An arrangement mode of the red laser diode 3, the green laser diode 4 and the blue laser diode 5 are shown in FIG. 4, which is a perspective view of the backlight. These laser diodes are arranged side by side at a small interval that is determined in accordance with the requirements on size and characteristics during the actual design.

It should be appreciated that, the currents with different intensities are applied to the red laser diode 3, the green laser diode 4 and the blue laser diode 5, respectively, so as to prevent the occurrence of different brightness effects for human eyes due to the luminous efficiency of the laser diodes with different spectra (i.e., different colors).

Preferably, the beam-expanding prism in this embodiment is a total internal reflection beam-expanding prism. There exist various methods for expanding the laser beams. Here, merely a method for expanding the laser beams with a prism is taken as an example.

The laser beam will be refracted when it passes through the prism, so a direction of an emergent ray is different from that of an incident ray, and any changes of an incident angle and a prism vertex angle may result in a change of a width of the laser beam, i.e., the laser beam may be reflected totally. As a result, it is able to prevent a decrease in the light utilization rate due to the refraction.

Figure 5:
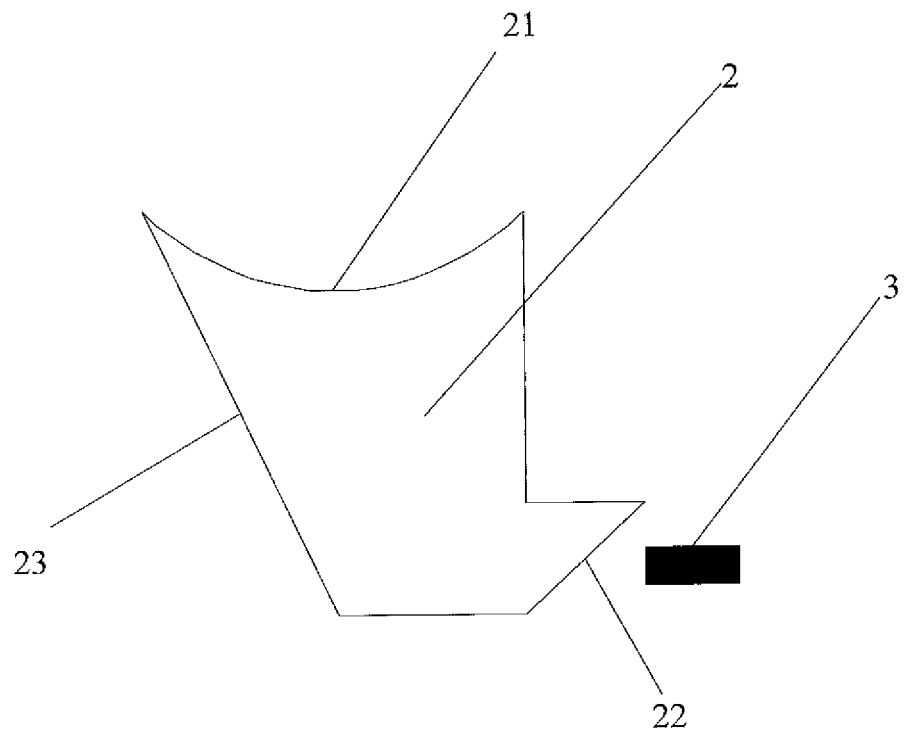
FIG. 5 is a schematic view showing structures and positions of a total internal reflection beam-expanding prism and a monochromatic laser diode according to one embodiment of the present disclosure.
Figure 6:
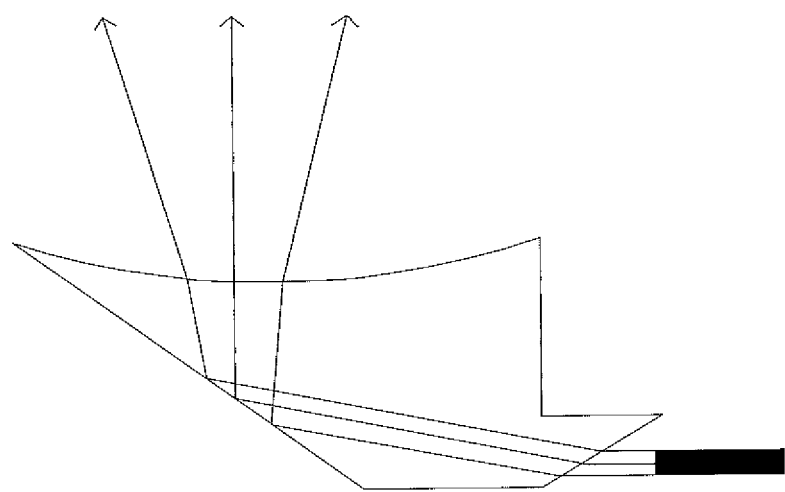
FIG. 6 is a schematic view showing a light path of a laser beam reflected by the total internal reflection beam-expanding prism according to one embodiment of the present disclosure.
Figure 7:
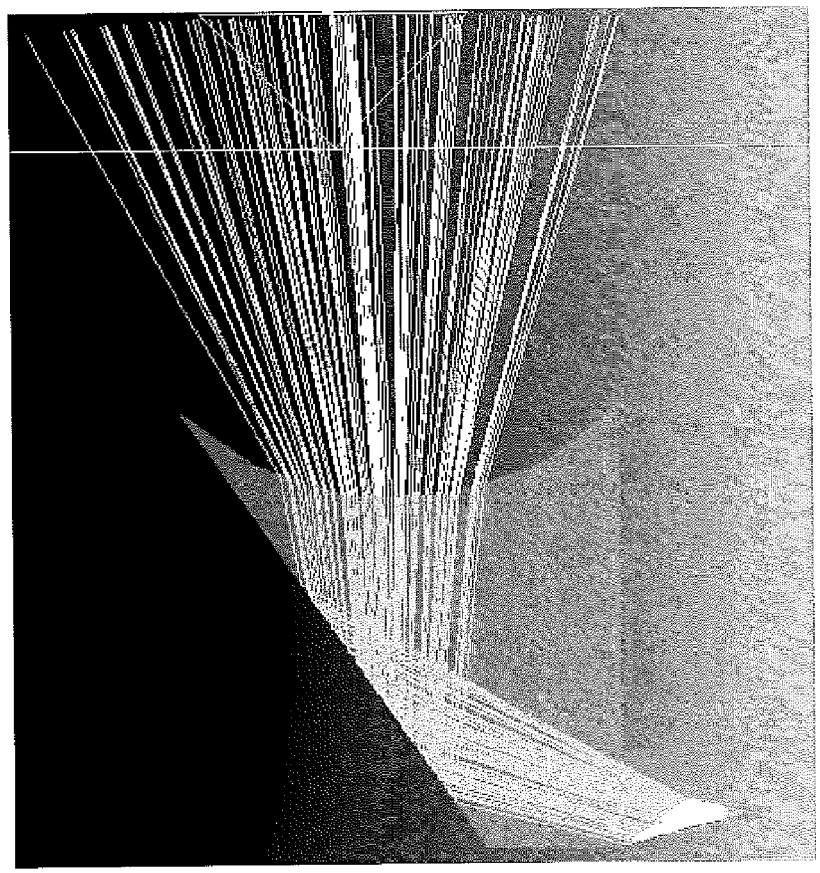
FIG. 7 is a schematic view showing a simulation with respect to the light path of the laser beam reflected by the total internal reflection beam-expanding prism according to one embodiment of the present disclosure.

Preferably, the total internal reflection beam-expanding prism 2 in this embodiment includes a beam-expanding surface 21, a refractive surface 22 and a totally reflective surface 23. As shown in FIG. 5, an oblique surface of the total internal reflection beam-expanding prism 2 located at a side close to the monochromatic laser diode and angled relative to the reflector 1 is just the refractive surface 22, an oblique surface of the total internal reflection beam-expanding prism 2 located at a side away from the monochromatic laser diode and angled relative to the reflector 1 is just the totally reflective surface 23, and an upper portion of the total internal reflection beam-expanding prism is just the curved beam-expanding surface 21. Specifically, the light rays from the monochromatic laser diode enter into the total internal reflection beam-expanding prism 2 through the refractive surface 22, and then are directed towards the totally reflective surface 23 after refraction. Afterwards, the light rays are directed towards the beam-expanding surface 21 after the total internal reflection on the totally reflective surface 23, come out from the total internal reflection beam-expanding prism 2 after being beam-expanded by the beam-expanding surface 21. Therefore, it is clear that the total internal reflection beam-expanding prism 2 functions as the following. On one hand, it can change orientation of the incident light from laser diode; on the other hand, it can also beam-expand the incident light at the same time. FIG. 5 shows the structures and positions of the total internal reflection beam-expanding prism 2 and the monochromatic laser diode 9, where the monochromatic laser diode 9 is located at a position on the reflector 1 close to the refractive surface 22. FIG. 6 is a schematic view showing the resultant light path, and FIG. 7 is a schematic view showing a simulation with respect to the light path.

Figure 8:
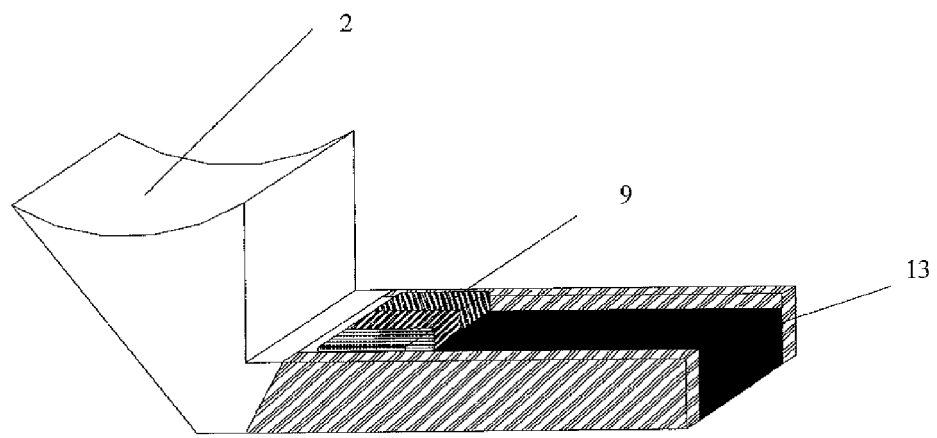
FIG. 8 is a schematic view showing a package in which the beam-expanding prism, the monochromatic laser diode and a heat dissipator are integrated according to one embodiment of the present disclosure.

Further, as shown in FIG. 8, the monochromatic laser diode 9 in this embodiment is welded onto the reflector 1, and the beam-expanding prism 2 and the monochromatic laser diode 9 are integrated into a package together with a heat dissipater 13. The reflector 1 is made of a metal material with excellent thermal conductivity. In addition, a package module in which the beam-expanding prism 2, the monochromatic laser diode 9 and the heat dissipater 13 are packaged may be directly used so as to obtain a direct-type laser backlight. The term "direct-type" refers to that the light source is arranged at the back of a display panel.

Figure 3:
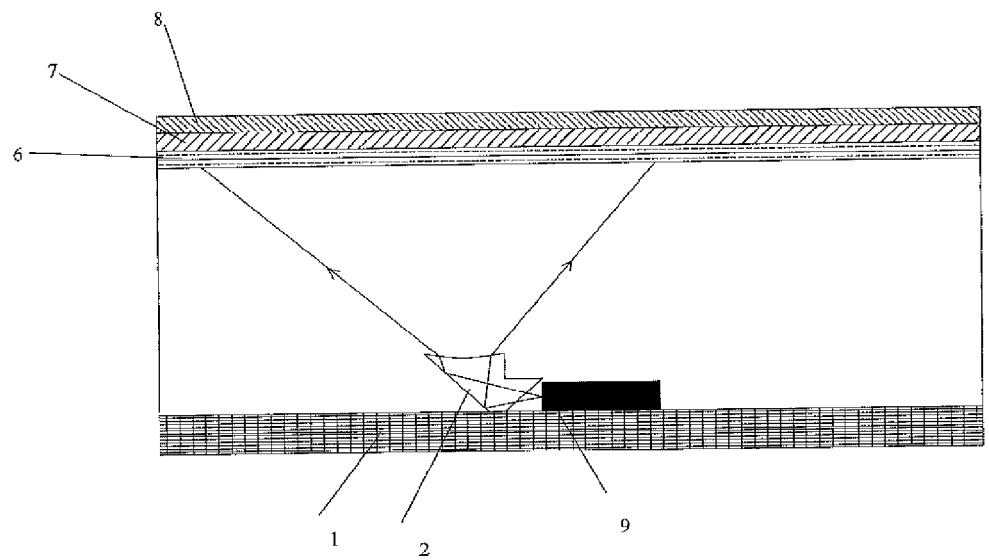
FIG. 3 is a sectional side view showing a backlight according to one embodiment of the present disclosure.

In addition, as shown in FIG. 3 and FIG. 4, apart from the monochromatic laser diode 9, the reflector 1 and the beam-expanding prism 2, the backlight further includes a lower brightness enhancement film 6, an upper brightness enhancement film 7 arranged above the lower brightness enhancement film 6, and a scattering film 8 arranged above the upper brightness enhancement film 7.

It should be appreciated that, during the actual application, the lower brightness enhancement film 6 and the upper brightness enhancement film 7 may be replaced with one layer of the brightness enhancement film in accordance with the need.

In a word, according to the present disclosure, an existing LED is replaced with the laser diode having such characteristics such as excellent monochromaticity, a light-emitting angle and linear polarization both much smaller than those of the LED as well as a small light outlet, so as to serve as the backlight. The monochromatic laser beams from the monochromatic laser diode are expanded after being reflected by the beam-expanding prism, so as to obtain the RGB backlight. Due to the excellent monochromaticity and high color purity, the transmittance of the laser beams on the liquid crystal screen can be improved.

The present disclosure further provides a display device including the above-mentioned backlight. Preferably, the backlight is a direct-type one. The display device uses laser beams as the light source, and the laser beams have such characteristics such as excellent monochromaticity, high color purity and excellent transmittance on the liquid crystal screen. As a result, it is able to improve its color effect.

The above amendments are for illustrative purposes only, but shall not be used to limit the present disclosure. A person skilled in the art may make further modifications and alterations without departing from the spirit and scope of the present disclosure. Hence, all equivalents of the present disclosure shall also fall within the scope of the present disclosure, and the scope of the present disclosure shall be subject to the appended claims.

What is claimed is:

1. A backlight, comprising a monochromatic laser diode, a reflector and a beam-expanding prism, wherein the monochromatic laser diode and the beam-expanding prism are arranged on the reflector, and monochromatic laser beams from the monochromatic laser diode are expanded after being reflected by the beam-expanding prism,
   wherein the beam-expanding prism is a total internal reflection beam-expanding prism; and
   wherein the total internal reflection beam-expanding prism includes a beam-expanding surface, a refractive surface and a totally reflective surface, the refractive surface is a light incident surface and forms a first angle relative to the reflector, the totally reflective surface is a surface of the total internal reflection beam-expanding prism opposite to the refractive surface and forms a second angle relative to the reflector, and the beam-expanding surface is a light-emitting surface and is a curved surface.

2. The backlight according to claim 1, wherein the monochromatic laser diode comprises a red laser diode, a green laser diode and a blue laser diode.

3. The backlight according to claim 2, wherein the red laser diode, the green laser diode and the blue laser diode are arranged side by' side on the reflector.

4. The backlight according to claim 3, wherein currents with different values are applied to the red laser diode, the green laser diode and the blue laser diode, respectively.

5. The backlight according to claim 2, wherein currents with different values are applied to the red laser diode, the green laser diode and the blue laser diode, respectively.

6. The backlight according to claim 1, further comprising a heat dissipator;
   wherein the monochromatic laser diode, the beam-expanding prism and the heat dissipator are integrated together.

7. The backlight according to claim 1, further comprising a brightness enhancement film and a scattering film, and the scattering film being arranged above the brightness enhancement film.

8. The backlight according to claim 7, wherein the brightness enhancement film comprises a first brightness enhancement film, and a second brightness enhancement film arranged above the first brightness enhancement film.

9. A display device, which comprises a backlight, comprising: a monochromatic laser diode, a reflector and a beam-expanding prism, wherein the monochromatic laser diode and the beam-expanding prism are arranged on the reflector, and monochromatic laser beams from the monochromatic laser diode are expanded after being reflected by the beam-expanding prism,
   wherein the beam-expanding prism is a total internal reflection beam-expanding prism; and
   wherein the total internal reflection beam-expanding prism includes a beam-expanding surface, a refractive surface and a totally reflective surface, the refractive surface is a light incident surface and forms a first angle relative to the reflector, the totally reflective surface is a surface of the total internal reflection beam-expanding prism opposite to the refractive surface and forms a second angle relative to the reflector, and the beam-expanding surface is a light-emitting surface and is a curved surface.

10. The display device according to claim 9, wherein the backlight is a direct-type backlight.

11. The display device according to claim 9, wherein the monochromatic laser diode comprises a red laser diode, a green laser diode and a blue laser diode.

12. The display device according to claim 11, wherein the red laser diode, the green laser diode and the blue laser diode are arranged side by side on the reflector.

13. The display device according to claim 11, wherein currents with different values are applied to the red laser diode, the green laser diode and the blue laser diode, respectively.

14. The display device according to claim 9, wherein the backlight further comprises a heat dissipator;
   wherein the monochromatic laser diode, the beam-expanding prism and the heat dissipator are integrated together.

15. The display device according to claim 9, wherein the backlight further comprises a brightness enhancement film and a scattering film, and the scattering film being arranged above the brightness enhancement film.

16. The display device according to claim 15, wherein the brightness enhancement film comprises a first brightness enhancement film; and a second brightness enhancement film arranged above the first brightness enhancement film.

* * * * *

UNITED STATES PATENT AND TRADEMARK OFFICE
CERTIFICATE OF CORRECTION

PATENT NO. : 9,651,204 B2
APPLICATION NO. : 14/416021
DATED : May 16, 2017
INVENTOR(S) : Shang Wang et al.

It is certified that error appears in the above-identified patent and that said Letters Patent is hereby corrected as shown below:

In the Claims

Column 5, Line 64, Claim 3:
After "arranged side"
Delete "by'"
And insert -- by --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*